Oct. 7, 1930.  B. BODRERO  1,777,908
FERTILIZER WITH A BASE OF PHOSPHATE AND SULPHUR
Filed July 15, 1926
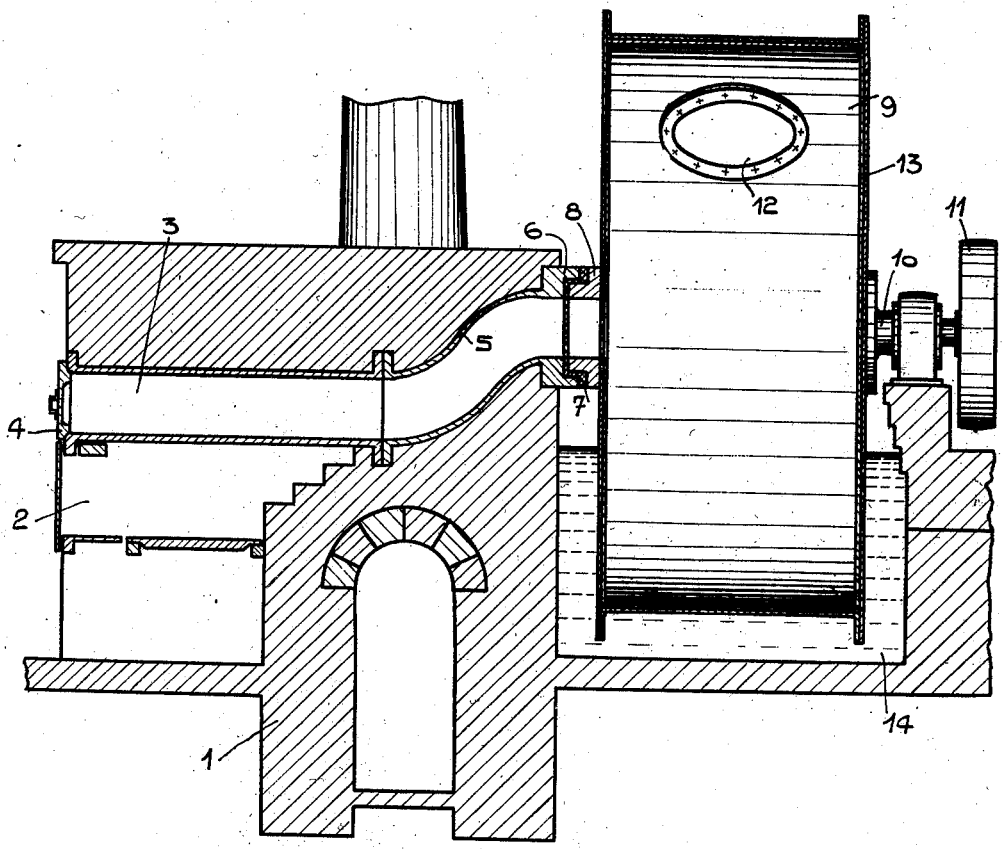
INVENTOR
Baptistin Bodrero
by
Langner Parry Card & Langner
Attys.

Patented Oct. 7, 1930

1,777,908

UNITED STATES PATENT OFFICE

BAPTISTIN BODRERO, OF PARIS, FRANCE

FERTILIZER WITH A BASE OF PHOSPHATE AND SULPHUR

Application filed July 15, 1926, Serial No. 122,736, and in Germany November 4, 1925.

The invention relates to a fertilizer consisting of phosphate and sulphur and its process of manufacture.

Up to the present, fertilizers of this type generally consist of mixtures of phosphate material and sulphur, in the form of finely divided or impalpable powder, and it has also been proposed to cause the intervention with such fertilizers of microbe vehicles of oxygen or sulphofying bacteria in a medium rendered favourable for example by the incorporation of vegetable earth, manure and so forth.

In all the known processes the sulphur was always directly incorporated by simple mixing with the phosphate material and finely divided therewith.

The object of the present invention is to materially increase the state of division of the sulphur relatively to the divided phosphate material and thus to obtain a more intense reciprocal action between the sulphur and the phosphate material, promoting solubility and consequently the more perfect assimilation of the fertilizer in the ground.

For preparing a fertilizer according to the invention, sulphur is sublimated into the finely divided phosphate material.

The phosphate material is subjected to the action of sulphur vapors and may have been previously subjected to treatment by steam or to steam and heat for the purpose of rendering it more porous. The sublimated sulphur condensing in the pores of the phosphate material, its state of division throughout the mass of phosphate material will be considerably increased.

In carrying out the invention sulphur ores or ores containing free or elementary sulphur or even by-poducts such as for example the resultant mass from the purification of gas-containing elementary sulphur, are heated by known means so as to produce sulphur vapors. The sulphur vapors are received and condensed in the phosphate material contained in a mixer lined with lead or other suitable material. The mass of phosphate material, for example tri-calcic phosphate (phosphate rocks), in which the sublimed sulphur in vapor is condensed may be stirred and be previously crushed into very fine powder. The sulphur thus attaches itself to each particle of cold calcic phosphate which is introduced into the mixing chamber in the required proportion so as to obtain a fertilizer suitable for the various natures of the earths to be cultivated.

For the purpose of rendering it more porous the cold phosphate material introduced into the mixing and condensation chamber may be subjected to a preliminary treatment by steam or by steam and dry heat in suitable baking ovens.

The final product constitutes a commercial product which consists of a phosphate and sulphur homogeneous fertilizer or "sulphur-phosphate" fertilizer of which the action on the microbial flora of the earth is the most efficient and the most useful for promoting vegetation, especially by the action which it is capable of producing in the presence of the micro-organisms contained in the earth.

The single figure shows in longitudinal section a form of installation for the execution of the process of the invention.

Sulphur, or sulphurous material, is subjected to distillation in a furnace 1 of that type such as is generally utilized for the refining of crude sulphur. The sulphurous material is heated by the fire box 2, in a retort 3, the latter having a hermetic closure 4. The retort 3 is prolonged by a curved conduit 5 of which one extremity carries a bell 6 which by means of a swivel joint 7 forms a bearing for the hollow trunnion 8 secured to one end of a rotatable drum 9 and communicating with the interior of the drum. The joint 7 is advantageously constituted by an antifriction metal such as lead or antimony which resists chemical action. The drum 9 can be constructed of sheet iron, but it is interiorly provided with a lining 13 of lead.

At its opposite head, the drum 9 is supported upon a suitable pillar by a trunnion 10 the free extremity of which carries an operating pulley 11.

The pulverized phosphatic material which as described, may previously have been subjected to the action of the dry heat in the retort, or to this action, combined with the heat of steam, is introduced into the drum 9 through a manhole 12.

The drum 9 turns in a tank 14 in which circulates cooling water. In this manner the vapors of the sulphur resulting from the distillation of the sulphurous material in the retort 3, are rapidly condensed upon the pulverized phosphatic material within the drum, the same being maintained constantly in agitation by the rotation of the drum.

When the operation is finished, the water in the tank 14 may be evacuated by a system of conduits not shown, and the product obtained may be discharged by any appropriate mechanical means from the manhole 12.

The sulphur-phosphate prepared according to the present invention may also enter into the combination of compound fertilizer. It may be mixed with organic material, nitrogen or potash fertilizers as may be desired.

What I claim is:—

1. The process for the manufacture of a fertilizer including a phosphatic material in the finely divided state, comprising sublimating sulphur into said finely divided phosphatic material.

2. The process for the manufacture of fertilizer consisting of phosphatic material and sulphur comprising the steps of treating the phosphatic material by heat, finely dividing said heat-treated phosphatic material, and sublimating sulphur into the finely divided phosphatic material.

3. The process for the manufacture of a fertilizer consisting of phosphatic material and sulphur, comprising the steps of treating the phosphatic material by steam and heat, finely dividing said treated phosphatic material, and sublimating sulphur into the finely divided phosphatic material.

4. A compound fertilizer comprising finely divided phosphatic material impregnated with sulphur in the sublimated state.

In testimony whereof I affix my signature.

BAPTISTIN BODRERO.